Oct. 9, 1956     F. J. FONTEIN ET AL     2,765,918
MULTIPLE HYDROCYCLONE
Filed May 11, 1953

INVENTORS
Freerk J. Fontein and
Cornelis Dijksman
BY
Cushman, Darby & Cushman
ATTORNEYS Oct. 9, 1956   F. J. FONTEIN ET AL   2,765,918
MULTIPLE HYDROCYCLONE Filed May 11, 1953                                    2 Sheets-Sheet 2

INVENTORS
Freerk J. Fontein and
Cornelis Dijksman
BY
Cushman, Darby & Cushman
ATTORNEYS

United States Patent Office 2,765,918
Patented Oct. 9, 1956

2,765,918

MULTIPLE HYDROCYCLONE

Freerk J. Fontein and Cornelis Dijksman, Heerlen, Netherlands, assignors to Stamicarbon N. V., Heerlen, Netherlands Application May 11, 1953, Serial No. 354,076

10 Claims. (Cl. 210—51)

This invention relates to hydrocyclones. More particularly it involves an assembly of a plurality of hydrocyclones in a structural unit referred to herein as a multiple hydrocyclone.

There are many processes today wherein small major diameter hydrocyclones can be used to advantage but usually such processes involve tremendous feed slurry volume rates. For that reason, in order to carry out hydrocyclonic separations it becomes necessary that an enormously large number of small hydrocyclones be used in parallel. In the case of hydrocyclones having a major diameter of the order of 10 mm. or less it would be obviously impractical to provide feed pipes to each one of the hydrocyclones and discharge pipes leading away from each one of the hydrocyclones. It is, therefore desirable to encase a plurality of these small hydrocyclones within one compact assembly having at least a common feed supply means, a common overflow discharge means, and a common underflow discharge means. One object in general of this invention is to develop such an assembly or structural unit; in short, to develop a multiple hydrocyclone.

Another object of this invention is to develop individual hydrocyclones and a housing for mounting them, the elements of which are readily and inexpensively made. A further object is to develop individual hydrocyclones that can be easily and inexpensively constructed from a plastic or other moldable material and to design such hydrocyclones of adequate strength to withstand high hydraulic pressures and turbulent flow conditions.

A further object of this invention is to develop a multiple hydrocyclone that has a large capacity per unit of space occupied. A still further object is to develop a multiple hydrocyclone that can be constructed for any given capacity without change in basic design or structure.

Another object of this invention is to devise individual hydrocyclones and means for mounting them so as to minimize stress and strain under static conditions and under operative conditions.

A further object is to devise a multiple hydrocyclone the elements of which are readily assessible, and which can be readily disassembled for repair and maintenance purposes.

Another object of this invention is to develop a multiple hydrocyclone wherein leakages of feed slurry and leakages of the discharge slurries are prevented within the structural unit and to the outside of the structural unit. Still another object of this invention is to develop a multiple hydrocyclone wherein the respective underflow and overflow discharges may be separately and directly collected in one chamber and withdrawn therefrom without loss of the obtainable pressure energy in each discharge. Similarly, an object of this invention is to devise a multiple hydrocyclone unit wherein the separation, collection of each discharge, and withdrawal may be accomplished in a satisfactory manner without exposure to the atmosphere.

Still another object is to develop a multiple hydrocyclone achieving the aforementioned objects, which can be readily inserted as a unit into banks of such units arranged and readily adaptable to be fed and operated in parallel, in series for successive separations of fraction of the feed slurry (sometimes referred to as "scalping") or in both series and parallel.

As this invention may be embodied in several forms without departing from the spirit thereof, the present embodiment is merely illustrative.

With this in mind reference is now made to the drawings.

Figure 1:
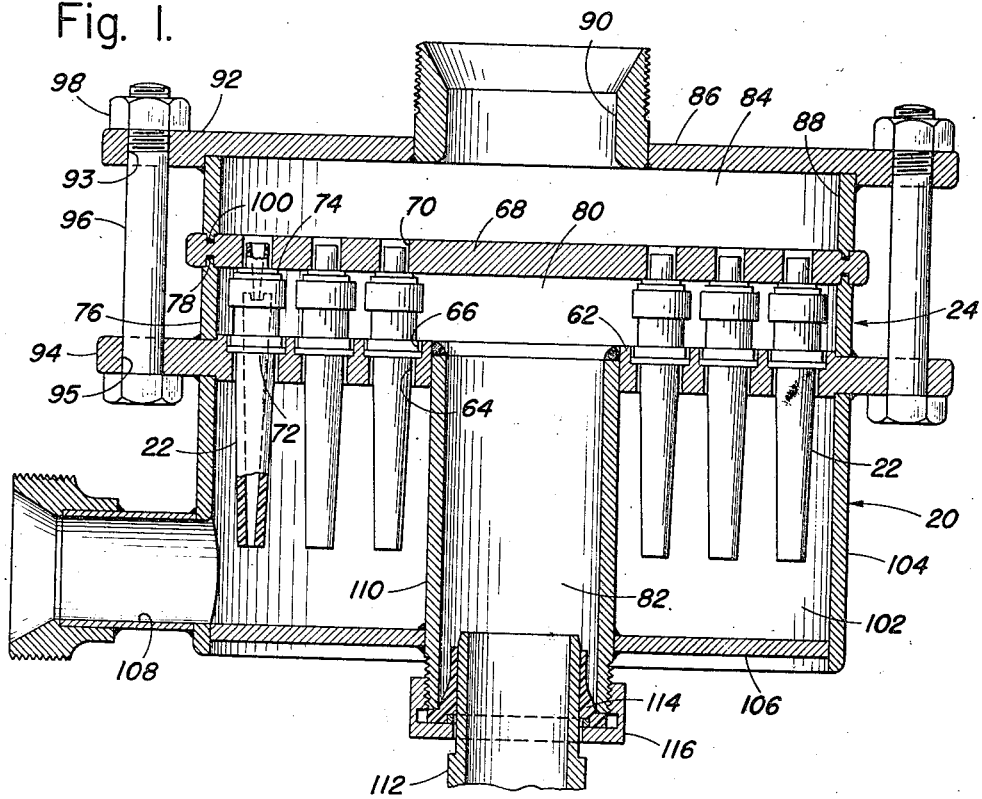
Figure 1 is a side view of a preferred multiple hydrocyclone.

Referring more particularly to the drawings, the multiple hydrocyclone 20 comprises a plurality of specially adapted individual hydrocyclones 22 mounted within a specially adapted housing framework 24.

Turning more particularly to Figures 4, 5, 6 and 7 it will be seen that the specially adapted individual hydrocyclone 22 comprises a tubular member 26 together with an end closure member 28, both constructed from a plastic material. The tubular member surrounds a vortex space 30 comprising a cylindrical section 32 one end of which passes through the base end of the tubular member and the opposite end of which is subtended without obstruction by a conical section 34. The conical section communicates to the outside of the tubular member by the coaxially disposed apex outlet 36. The base end of the tubular member 26 is ordinarily capped by end closure member 28 which comprises a circular platelet 38 of diameter larger than the diameter of the cylindrical section 32 and through which a centrally disposed outlet 40 which, when the platelet is in position, is axially aligned with the axis of the vortex space, and which functions as the overflow outlet. The overflow outlet preferably comprises a tubular conduit 42, extending through the platelet 38 and integral therewith, which conduit has a vortex space section referred to herein as the vortex finder 44, and an external section 46 projecting away from the end closure member 28. It will be noticed that for conversion of kinetic energy in the liquid flow through the conduit 42 into pressure energy at or near its outlet, the internal diameter of the conduit gradually increases from its vortex finder intake end to the external section outlet end.

At the base end of the cylindrical section 32 it will be observed that there is a feed inlet 48 which is the discharge end of the feed conduit 50 comprising a channel-like groove 52 passing through the wall of tubular member 26 to terminate tangentially at the periphery of the cylindrical section 32, and that portion of the infeed end surface 54 of the platelet 38 covering the groove when the end closure member is in position.

It will be noted that tubular member 26 is provided with an interrupted outside cylindrical shell 56 about its base end through which the groove 52 passes. This shell, adapted to receive the platelet 38, is provided to prevent lateral movement of the platelet and to position the end closure member 28. Preferably the shell 56 should not extend beyond the discharge end surface of the platelet 38 when the platelet is in position. The platelet 38 is provided with a sidewise extending projection 58 adapted to fill in the interrupted portion of the cylindrical shell 56. Preferably, the interrupted part of the shell and the sidewise projection of the platelet are at and about the channel-like groove 52.

Tubular member 26 is likewise provided near the base end thereof with an enlargement shown here as an annular ring-like projection 60.

Figures 2, 3:
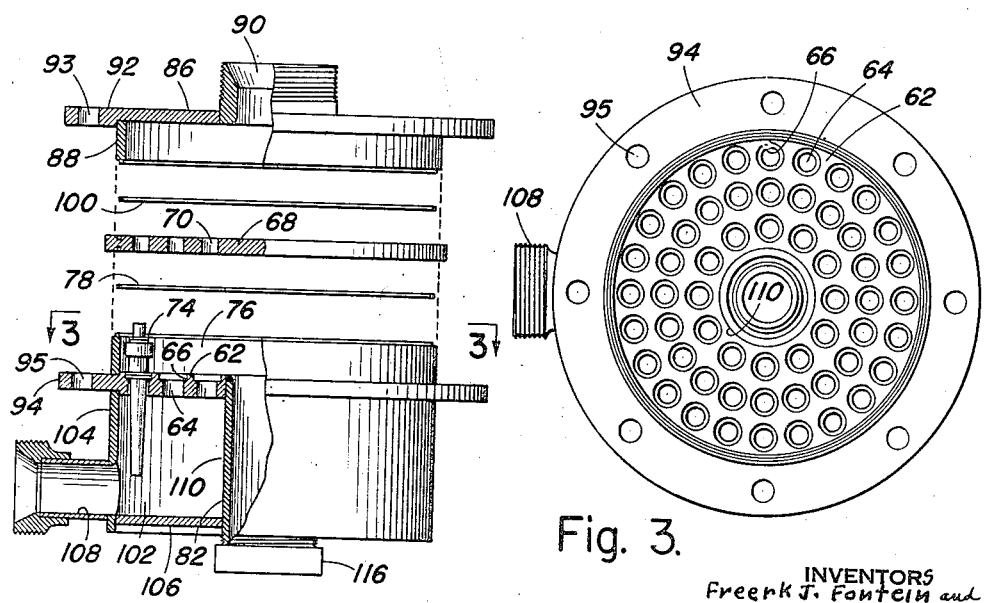
Figure 2 is an exploded partially cut-away side view of the housing assembly of Figure 1.
Figure 3 is an end view of the mounting plate taken along the lines 3—3 of Figure 2.
Figure 4:
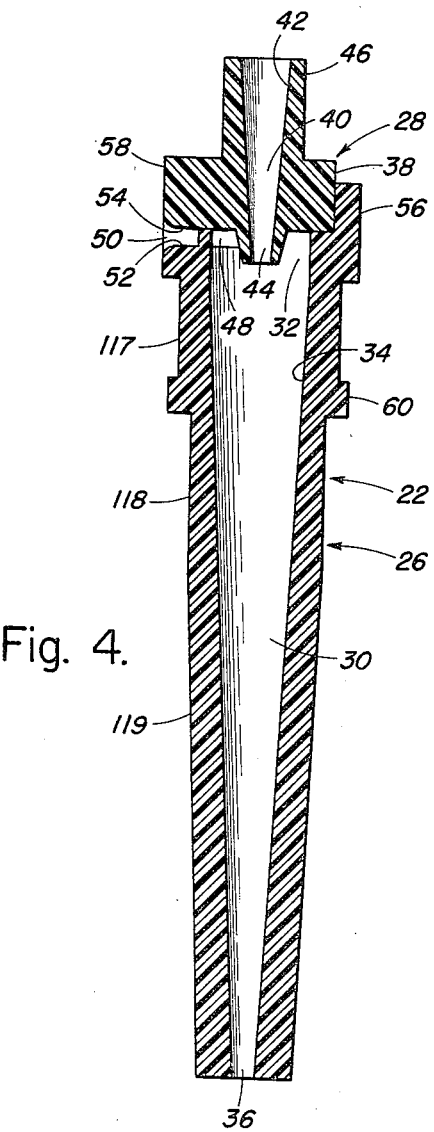
Figure 4 is a side cut-away view of the assembled parts which cooperate to form a specially adapted individual hydrocyclone.
Figure 5:
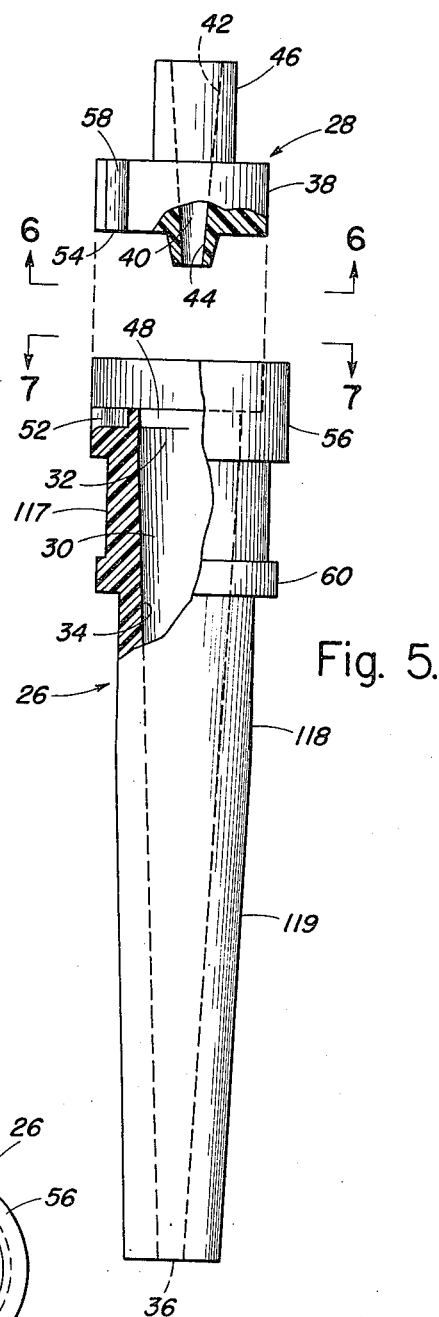
Figure 5 is an exploded partially cut-away side view of the hydrocyclone shown in Figure 4, showing the various structural parts of this embodiment.
Figures 6, 7:
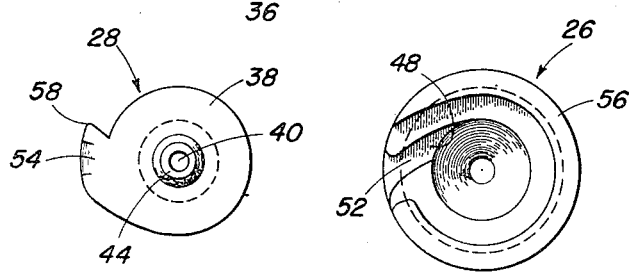
Figure 6 is an end view of the end closure member taken along lines 6—6 of Figure 5.
Figure 7 is the base end view of the tubular member taken along lines 7—7 of Figure 5.

Turning back to Figures 1, 2 and 3, it will be seen that the housing assembly for mounting the hydrocyclones essentially comprises a metallic mounting plate 62 through which there are a plurality of bores or holes 64, equidistant from each other, and each having a diameter at least as large as the largest outside diameter of the tubular member between the underflow discharge end and the annular projection 60, but not greater than that of the said annular projection. On one side of the plate it will be observed that the holes are recessed as at 66, with the recess portion having a diameter at least large enough to receive the annular projection 60 on each individual hydrocyclone. The housing assembly 24 also essentially comprises a metallic retaining plate 68 through which holes 70 are bored a diameter larger than that of the overflow outlet 40 but not larger than the major outside diameter of the cylindrical shell 56. In mounting each hydrocyclone the tubular member 26 is inserted through rubber washer 72 until the annular projection is reached and then, with end closure member 28 in place, is inserted into the mounting plate holes 64 until the washer 72 is reached. A rubber washer 74 is placed about the overflow outlet 40 next to the discharge end surface of the platelet 38 and the retaining plate 68 is placed so that with the holes 70 in the plate aligned with the corresponding overflow outlets of each hydrocyclone the plates rest on the washer 74. Between the plates and at the periphery thereof it will be observed that there is a metallic cylindrical peripheral shell 76. This peripheral shell is preferably permanently secured to one of the plates and detachably secured to the other of the plates to enable the housing frame to be disassembled when desired. In the drawings, the cylindrical shell 76 is shown welded to the mounting plate 62 and detachably secured to the retaining plate 68. To prevent leakage gasket 78 is disposed at the joint between the cylindrical shell 76 and the retaining plate 68.

It will be observed that the space between the retaining plate 68 and the mounting plate 62 and confined by the peripheral shell 76 defines a common feed chamber 80. Feed means 82 are shown being centrally disposed to this chamber for the forcible introduction therein of feed slurries. Accordingly, the intake end of the feed conduit 50 of each hydrocyclone is shown facing towards the outer periphery of the mounting plate 68.

In operation feed slurry is introduced by way of the feed means 82 into the feed chamber 80 from whence it passes through the feed conduit 50 of each hydrocyclone 22 to tangentially enter the base end of the vortex space 30. A portion of the liquid flows toward the apex outlet 36 and the remainder flows toward the overflow outlet 40. In so doing both centrifugal forces and drag forces are developed whereby particles of different settling rates in the feed slurry are separated into a fraction containing particles of settling rates greater than a critical settling rate which is withdrawn at the apex outlet as underflow, and a fraction containing particles of settling rates less than a critical settling rate which is withdrawn at the overflow outlet as overflow.

To collect the overflow discharge without exposure to the atmosphere overflow discharge chamber 84 may be provided. It will be observed that the overflow discharge chamber comprises a peripheral shell 88 disposed at one end about the periphery of the retaining plate 68 and closed off at the other end by the end plate 86 through which there is a discharge conduit 90. In the particular embodiment shown the clamping means comprises an annular flange 92 integral with the end plate 86 and containing holes 93 bored therethrough, an annular flange 94 integral with the mounting plate 62 with holes 95 bored therethrough. The holes 95 are aligned with the holes 93, bolts 96 passed through said holes and nuts 98 screwed on to the ends of the bolts 96. By sufficient tightening of the nuts 98 about the bolts 96, clamping forces are applied to prevent leakages at the various joints of the assembly and to hold the end closure members 28 in place. Although the cylindrical shell 88 is shown welded to the end plate 86 and detachably secured to the retaining plate 68 it will be realized that it may likewise be permanently attached to retaining plate 68. However, for cleaning and repear purposes the cylindrical shell 88 is shown detachably secured to the retaining plate 68 and to minimize leakages at the joint therebetween, a gasket 100 is disposed between the shell 88 and the retaining plate 68.

Similarly, it may be desired to collect the apex discharge without exposure to the atmosphere and in such case an apex discharge chamber 102 may be provided. Such a chamber 102 may comprise a cylindrical shell 104 secured at one end to the periphery of the mounting plate 62 and closed off at the opposite end by an end plate 106. At a convenient point in the chamber 102 there may be disposed a discharge conduit 108.

In such an arrangement the feed means 82 may comprise a central pipe 110 passing through the end plate 106 through the chamber 102 and terminating in the feed chamber 80.

In order that the multiple hydrocyclone unit 20 may be easily removed from the feed line the central pipe is terminated outside of the apex discharge chamber 102 and the feed pipe 112 is inserted into the central pipe 110. Leakage is prevented at this joint by a pressure sealing rubber collar 114 disposed about the feed pipe 112, and the collar and feed pipe held in place by a union 116 which screws about the end of the central pipe 110 projecting outwardly about the end of the end plate 106. The discharge ends of the discharge conduits 90 and 108 are preferably terminated just outside of the multiple hydrocyclone unit and detachably joined thereat to conventional pipes by conventional coupling means.

Although the outside shape of the individual hydrocyclone, in particular the tubular member 26, may be of a generally conical form, or a generally cylindrical form, it is preferred that within the common feed chamber 80 the wall thickness of portion 117 of the tubular member 26 be great enough to withstand the hydraulic pressures and turbulence within that chamber. Because of the somewhat greater hydraulic pressure in the feed chamber 80 and greater turbulence in the chamber this thickness will generally be greater than that portion of the tubular member extending into the apex discharge chamber 102. It is preferred that the portion 118 of the tubular member below the annular projection 60 have a more or less cylindrical shape for all of that region protected by the mounting plate 66, and the remaining portion 119 of the tubular member be conically shaped in order that lateral movement of the individual hydrocyclones 22 during operation may be minimized.

It will be understood that the discharge conduit 90 can be directly connected to feed means such as feed means 82 of a second multiple hydrocyclone. In that manner two or even more multiple hydrocyclones can be arranged in series with one upon the other. In such an arrangement the bolts 96 may be long enough to clamp all multiple hydrocyclones which are arranged the one upon the other together.

We claim:

1. A multiple hydrocyclone comprising a plurality of individual hydrocyclones, each individual hydrocyclone having a lateral enlargement adjacent but axially spaced from the infeed end thereof and an overflow outlet extending centrally from the infeed end thereof, an apertured mounting plate supporting said hydrocyclones in its apertures and bearing against the underside of said lateral enlargement of each, an apertured retaining plate enclosing the overflow outlets of said hydrocyclones in its apertures and bearing against the infeed ends thereof, a peripheral shell extending between said mounting plate and said retaining plate, said peripheral shell with said mounting and retaining plates defining a common feed chamber enclosing the upper ends and the feed openings of all said hydrocyclones, conduit means communicating with said feed chamber for the introduction of feed thereinto, clamping means for forcibly urging said mounting plate and said retaining plate toward each other to seal said common feed chamber, means including the outer surface of said retaining plate defining a common discharge chamber enclosing the overflow outlets of said hydrocyclones, and means including the outer surface of said mounting plate defining a common discharge chamber enclosing the underflow outlets of said hydrocyclones.

2. A multiple hydrocyclone as defined in claim 1 wherein the means defining a common discharge chamber for the underflow comprises a peripheral shell end engaged to the outer surface of said mounting plate, an end closure disposed at the opposite end of said shell, and discharge conduit means communicating with the underflow collection chamber so formed.

3. A multiple hydrocyclone as defined in claim 2, wherein said means defining a common discharge chamber for the overflow comprises a peripheral shell end engaged to the outer surface of the retaining plate, and end closure member mounted at the opposite end of said shell, and discharge conduit means communicating with the overflow collection chamber so formed.

4. A multiple hydrocyclone as defined in claim 3, wherein said overflow, feed and underflow chambers are cylindrical, said hydrocyclones are arranged in concentric circular rows, and said conduit means communicating with said feed chamber passes through said underflow chamber and enters said mounting plate at the center thereof.

5. A multiple hydrocyclone as defined in claim 1, wherein said individual hydrocyclones are substantially identical, each comprising a tubular member molded from plastic material enclosing a radially symmetrical space, an end closure member abutting one end of said tubular member, and an overflow outlet in said end closure member axially aligned with said space, the abutting surfaces of said tubular member and end closure being cooperatively formed to define together a feed opening tangentially entering the infeed end of said space by means of a groove in at least one of said surfaces, and said tubular member and end closure being cooperatively formed to interfit and insure proper relative positioning therebetween.

6. A multiple hydrocyclone as defined in claim 1, including resilient washers between each hydrocyclone and said mounting and retaining plates.

7. A hydrocyclone comprising a unitary tubular member molded from plastic material enclosing a radially symmetrical space, said space including a cylindrical section at the infeed end thereof merging without obstruction into a conical section extending to the opposite end of said tubular member and terminating in an underflow outlet, a lateral enlargement extending outwardly from said tubular member adjacent but axially spaced from the infeed end thereof, an end closure member abutting the infeed end of said tubular member, an overflow outlet in said end closure member axially aligned with said space, the abutting surfaces of said tubular member and end closure being cooperatively formed to define together a feed opening tangentially entering the infeed end of said space by means of a groove in at least one of said surfaces, and said tubular member and end closure being cooperatively formed to interfit and insure proper relative positioning therebetween, and clamping means adapted to engage said end closure member and the underside of the lateral enlargement of said tubular member to maintain said members in aligned abutment by pressure restricted to the infeed end of the device.

8. A hydrocyclone as defined in claim 7, wherein the overflow outlet in said end closure member comprises a tubular conduit the inner end of which extends coaxially into the cylindrical section of said radially symmetrical space and the outer end of which extends coaxially in the opposite direction.

9. A multiple hydrocyclone as defined in claim 1, wherein the lateral enlargement of each hydrocyclone is radially symmetrical.

10. A hydrocyclone as defined in claim 7, wherein said lateral enlargement is radially symmetrical.

References Cited in the file of this patent

UNITED STATES PATENTS

| | | |
|---|---|---|
| 2,102,525 | Freeman | Dec. 14, 1937 |
| 2,341,087 | Dunham | Feb. 8, 1944 |
| 2,622,735 | Criner | Dec. 23, 1952 |

FOREIGN PATENTS

| | | |
|---|---|---|
| 170,856 | Austria | Apr. 10, 1952 |
| 503,836 | Belgium | June 9, 1952 |